United States Patent [19]

Moraw et al.

[11] 4,304,809

[45] Dec. 8, 1981

[54] IDENTITY CARD WITH GRID IMAGES

[75] Inventors: Roland Moraw, Wiesbaden; Götz von dem Bussche, Schwalbach, both of Fed. Rep. of Germany

[73] Assignee: Hoechst Aktiengesellschaft, Frankfurt am Main, Fed. Rep. of Germany

[21] Appl. No.: 101,182

[22] Filed: Oct. 7, 1979

[30] Foreign Application Priority Data

Dec. 14, 1978 [DE] Fed. Rep. of Germany ....... 2853953

[51] Int. Cl.³ .............................................. B32B 3/00
[52] U.S. Cl. ...................................... 428/195; 427/7; 428/201; 428/203; 428/213; 428/916
[58] Field of Search ............... 428/195, 915, 916, 201, 428/203, 213; 427/7; 204/15, 286; 430/11

[56] References Cited

U.S. PATENT DOCUMENTS

| | | | |
|---|---|---|---|
| 2,932,913 | 4/1960 | Hannon | 428/916 X |
| 3,391,479 | 7/1968 | Buzzell et al. | 427/7 X |
| 3,457,661 | 7/1969 | Peters | 428/916 X |
| 4,092,234 | 5/1978 | Horst et al. | 204/286 |
| 4,269,915 | 5/1981 | Moraw | 430/11 |

FOREIGN PATENT DOCUMENTS

| | | |
|---|---|---|
| 2308876 | 9/1973 | Fed. Rep. of Germany . |
| 2639464 | 11/1977 | Fed. Rep. of Germany ...... 204/286 |
| 2657246 | 2/1978 | Fed. Rep. of Germany .......... 427/7 |
| 2734581 | 6/1978 | Fed. Rep. of Germany .......... 427/7 |

OTHER PUBLICATIONS

Von F. Bestenreiner et al., "Optik", vol. 28, 1968/69, pp. 263-287.
M. T. Gale, "Optics Communications", vol. 18, No. 3, Aug. 1976, pp. 293-303.
KiKnop, "Optics Communications" vol. 18, No. 3, pp. 298-302.

*Primary Examiner*—Thomas J. Herbert, Jr.
*Attorney, Agent, or Firm*—Schwartz, Jeffery, Schwaab, Mack, Blumenthal & Koch

[57] ABSTRACT

Disclosed is an identity card having grid images thereon comprised of a linear grid structure. In various embodiments, the grid depths of the individual grid images differ and can produce several different image colors. The card in a further embodiment can comprise a number of layers which are laminated together around a card core which has a window located therein. A number of variations of grid images can be included and/or superposed in the window in order to provide a security identification system which is extremely difficult to forge. Also disclosed are numerous combinations of grid structures some of which include grid images which may be absorption images and/or phase images.

16 Claims, 7 Drawing Figures

IDENTITY CARD WITH GRID IMAGES

BACKGROUND OF THE INVENTION

The present invention generally relates to identity cards, and particularly to those comprised of several layers and carrying, at a suitable point on one or more of the layers, information which serves to identify the cardholder. The card could have additional security markings, such as guilloche figures, as protection against forgeries.

Cards of this type in the form of identity cards, cheque cards, credit cards, pass cards or other identification papers generally comprise an identity card core, provided with data relating to the holder, made of paper or of thermoplastic films, for example of polyvinyl chloride, which are assembled in layers to give the card core. For protection in use and for security against forgeries or unauthorized alterations of the data, the card core is covered by or laminated to external transparent films.

In the prior art identity cards are produced as a fused laminate in which a card core, carrying the information, is protected by transparent films of a nature which differs from that of the cord core. West German Offenlegungsschrift No. 2,308,876 describes such an identity card consisting of a relatively thick carrier film and a thin transparent film, between which there is a special paper having internal features, such as watermarks, banknote print or the like, which serve for protection against forgeries. Differences in the thickness of the paper can be the result of the three layers being plasticized together such that the internal features are manually, mechanically and/or visually detectable through the transparent film. Further markings which serve to identify the cardholder are provided at a suitable point in this type identity card. For example, a photograph in the form of a film transparency may be inserted between the special paper and the carrier film and would be firmly bonded to the special paper. Furthermore, at any desired point on the front or rear of the identity card, a strip of special paper could be laminated or printed according to security technology, onto the outside of the plastic material, to provide a field for later signatures or other hand-written entries.

In identity cards it is primarily the card core which is provided with security markings for preventing a forgery by imitation. It is obvious that the best protection against forgeries is obtained by a combination of different security markings and a card which consists of a laminate of layers which are resistant to attempts at separating them into individual layers and hence resistant to fraudulent interference with the information and security markings applied to the layers. In West German Patent Application No. P 28 38 759.3 corresponding to copending U.S. Pat. application Ser. No. 70,737 filed Aug. 29, 1979 such a card is discussed which has a composite card core and an upper and a lower cover layer consisting of polymers which can be fused by heat to provide a laminate. Because of the identical consistency of all the layers of the laminate, once the layers are fused during lamination, it is not generally possible to separate the layers in such an identity card without destroying the security markings applied to the card core. Possible security markings include intricate line patterns, watermarks in the case of paper, photographs of the cardholder and the like. However, if, contrary to expectation, somebody were to succeed in separating the card laminate without damage to the individual layers, it would be technically easy to forge or imitate security markings of this type.

SUMMARY OF THE INVENTION

It is an object of the present invention to provide an identity card which is provided with security features which can be imitated and forged only with large technical effort and by special techniques which are correspondingly difficult to manipulate.

The above and other objects are achieved by providing an identity card which contains, as security markings, grid images having a linear grid structure. In one preferred embodiment the grid depths of the grid images differ and each reproduces one defined image color on readout.

In a further embodiment of the invention, the card core of the card has a window in which a grid image carrier for the grid images is located. For this purpose, the grid images are applied to the grid image carrier which is inserted into the window. It is also possible that the grid image carrier extends beyond the zone of the window.

BRIEF DESCRIPTION OF THE DRAWINGS

A more complete appreciation of the invention and the attendant advantages thereof will be more clearly understood by reference to the following drawings, wherein.

DETAILED DESCRIPTION OF PREFERRED EMBODIMENTS

Figure 1:
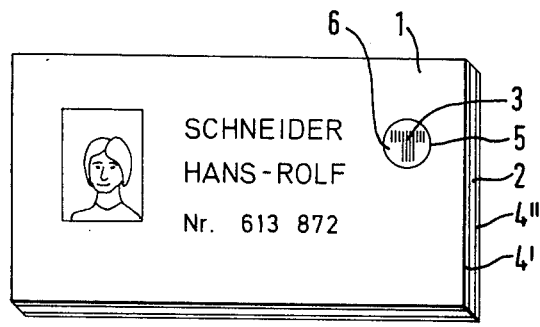
FIG. 1 is a front perspective view of an identity card with grid images.

Referring now to the drawings wherein like reference characters designate like parts throughout the several views, an identity card 1 is shown in FIG. 1. The front shows the photograph of the cardholder, his surname and Christian name, and an identification number. Furthermore, the front of the card 1 can be provided with the signature (not shown) of the cardholder. The identity card 1 includes a card core 2 which is at least one layer. In the card core 2, there is a window 5 in which one or more grid images 3 appear. The card core 2 is covered or laminated, respectively, on the front and on the rear with films 4' and 4". These films serve to protect the identity card 1 in use and to secure it against forgeries or unauthorized alterations of the data. These films 4', 4" are transparent and in general are of the same fusible polymers, for example polyolefines, polyamides, polyvinyl chloride or the like, as the card core 2.

Compared with the total area of the front of the identity card 1, the grid images 3 include only a small area. As a rule, they contain the information therefore on a reduced scale, in a similar manner as does conventional microfilm. Microfilm images could be used in the identity card 1 as one of the security markings if, for example, they store the identity card 1 as a reduced image or store additional information or data about the cardholder. But, compared with the conventional microfilm images, the use of grid images provides better security against forgery, since the production of grid images is more difficult than that of microfilm images.

Holograms recorded on a holographic film could also be used by inserting an appropriately sized portion into the window. In this situation, an image of the front of the identity card 1 might be holographically produced on the piece of holographic film by appropriately controlling the path of a laser beam for recording a hologram. The hologram obtained in this manner would then be thermally developed and fixed by cooling and inserted into the card. However, the characteristic distinguishing holograms from grid images is that a hologram stores the information of the entire recorded area on each image dot. Therefore, all information of the recorded area could be reproduced from a small portion of the holographic film in the card window. The grid image recordings would be safer because they cannot be divided in the same manner as hologram recordings, because only a part of the original information would be present in the corresponding portion of the grid image recording.

The grid images 3 for an identity card can be produced by forming an optical image of grid structures on top of an image present on a recording material, that is to say by superposing a grid structure on an image. This technique of image recording is known as carrier frequency photography and is described, for example, in the journal "OPTIK", Volume 28, 1968/69, pages 263–287.

Photographic layers based on silver halides, and also other light-sensitive layers, such as photolacquers or photoconductive, thermoplastic layers, are suitable for recording the image. The following discussion is not complete and is only exemplary of this method of image recording. There is a distinction between absorption grids and phase grids or absorption images and phase images. In carrier frequency photography, recording is effected by modulation with a spatial frequency, that is to say the periodic fluctuation of density or light path length within the photographic layer due to the grid structure reproduced in the image. The spatial frequency would have a local density distribution or optical path length distribution representing the image signal. The image-modulated spatial frequency results in density differences in the silver grains in the photographic layer or density differences due to the toner in the development of the photoconducting layer. These density differences yield an absorption grid which is reconstructed by diffraction on the spatial carrier frequency. Better results in reconstruction are obtained with rehalogenated, for example rechlorinated, silver images as phase images. Here the information-carrying structure provides an optical path length image which is composed of an external relief in the gelatine and an internal relief in the differences in refractive index, which are caused by the different levels of silver halide concentrations.

In the case of bleached silver film, the gelatine produces both periodic differences in the refractive index and periodic changes of the layer thickness. Unbleached silver film is accordingly a mixed form of absorption grids and phase grids. Grids produced in thermoplastic photoconducting layers or grids in photolacquer layers are largely pure phase grids having relief structures. The relatively light-sensitive silver halide layers and the likewise light-sensitive photoconducting and, if appropriate, thermoplastic layers, which are electrostatically charged, exposed and either developed with toner or heated until a relief image has formed, are suitable for recording individual grid images of, for example, the entire identity card with all the data including a photograph of the cardholder. The less light-sensitive layers from photolacquers, especially from positive-working photolacquers with o-quinone-diazide as the light-sensitive substance, are particularly suitable for the recording of very high-grade grid structures which have a high line density per millimeter and are thus relief images which are difficult to imitate and which contain general security markings, such as, for example, emblems, code numbers, code words and the like.

This relief grid image technology has reached a very high technical state which makes it possible to produce relief grids having up to 600 lines per millimeter with a sine-shaped or oblong-shaped grid profile which can be determined beforehand. From these relief grid images, nickel masters are produced by means of which duplicates are prepared by embossing thermoplastic films, for example polyvinyl chloride films. These grids are particularly suitable for producing general security markings, such as emblems, coats of arms and the like, which sometimes are complemented by an item allocated to a relatively large number of cards, such as a series main number. Grids of this type are described in the journal "OPTICS COMMUNICATIONS", Volume 18, 1976, No. 3, pages 292–303.

In principle, the line spacings in the production of grid images are not limited on the side of either large or small dimensions. However, an image can be called a grid image only if at least one grid period extends over the recording area. In the case of grid images which are read out by light reflection, this is the entire card and, in the case of grid images which are read out by light transmission, this is the diameter of the window opening. Preferably, grid periods are selected which are substantially smaller than the diameter of the card or of the window opening, in order to obtain a clear diffraction effect on the grid. For example, the grid images can contain from ten lines per millimeter to several hundred lines per millimeter. Typical effects, based on the diffraction, then occur, as in the case of colored grid images which have an oblong-shaped cross section of the relief structures. Viewing with the naked eye is possible at about one hundred lines per millimeter of the grid image, and these effects are particularly clear above about four hundred lines per millimeter. Such line structures are produced on the photographic layer by contact exposure, projection of an image or by interference of laser light.

Figure 2:
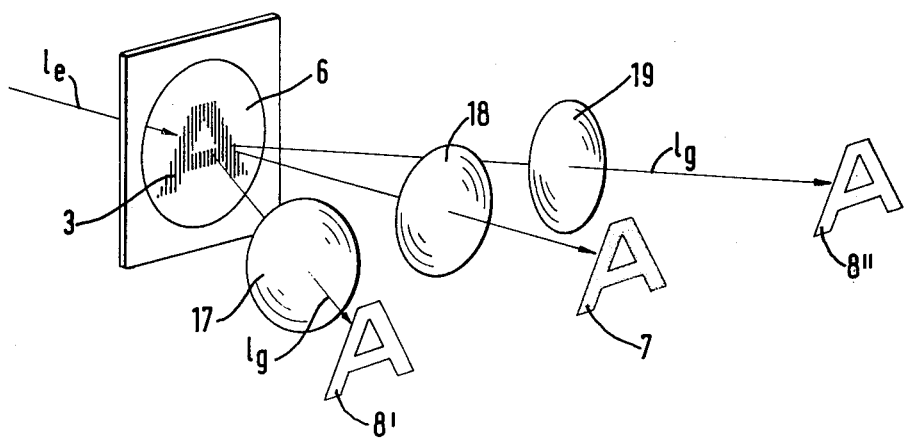
FIG. 2 is a front perspective view showing the reconstruction of grid images of an identity card.

The reconstruction of the absorption image or phase image, modulated with a carrier frequency, is effected as a diffraction process on the spatial carrier frequency, as shown in FIG. 2 by the arrangement in principle. A part of the incident light $l_e$ is deflected on the grid structure A as diffracted light $l_g$, since the grid structure acts as a diffraction grating even in imagewise distribution. By means of a lens system 18 indicated diagrammatically, the reconstructed image 7 can be reproduced in the direction of the axis of the incident light $l_e$. Moreover, reconstructions 8', 8" in the direction of the diffracted light beam $l_g$ are possible.

Since the line spacing will be known and the line orientation relative to the image will be known, it is possible to set a multiplicity of deflection angles. Superposed grid images can be read out separately with diffracted light if each image is superposed by a characteristic line structure. This leads to a large number of possible combinations of angle settings and image superpositions so that the selection and fixing to one or several angle settings, possibly superposed by blank settings, that is to say grid images without any information content, will constitute a security marking. The reconstruction must then be carried out accurately under the fixed angles so that exact readout is possible by means of the corresponding diffraction on the particular grid.

In "OPTICS COMMUNICATIONS", Volume 18, 1976, No. 3, pages 292–303, sine-shaped relief grids for black and white projection images and oblong relief grids for colored projection images are described. As a result of the color and the combination possibilities thus provided, a further security stage is reached, since it is evident that the relief grid depths for particular colors must be accurate to a few hundredths $\mu$m and cannot be duplicated without a knowledge of the technique required for producing them.

Colored projection images can also be produced by the superposition of the grid images, corresponding to color separation images, under different grid structures and by projection through appropriate filters which are arranged in the paths of the rays concerned, as can be seen from the journal "OPTIK", Volume 28, 1968/69, page 278. Special Schlieren projectors are required for projection. In the case of oblong-shaped relief grids of a defined relief depth, colored projection images can be reproduced with normal projection lens systems ("OPTICS COMMUNICATIONS", Volume 18, 1976, No. 3, pages 292–303) or the colored images can be visually observed, which enhances the practicability.

Figure 3:
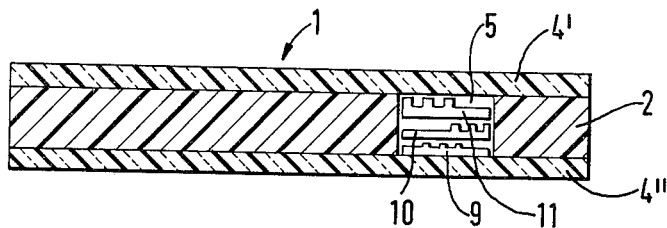
FIG. 3 is a side cross-sectional view of an identity card with grid images which comprise part images.

The build-up of an identity card 1, the reconstruction of which gives a multi-colored image from oblong-shaped relief grids, is described by reference to FIG. 3. Although the application of grid structures to identity cards is unknown, the superposition of three layers of grid structures (where each layer has a constant grid depth) is well known. Three color separation images are mutually superposed on three grid layers in the window 5 of the card core 2. These composite grid layers consist of part images 9, 10, 11 for yellow, magenta and cyan respectively. The front and rear of the card core 2 are each laminated with a transparent film 4' and 4" respectively. It is obvious that the insertion in a true fit of three grid layers or grid images into the opening of the window 5 is difficult. Instead, it is possible to use a technique in which oblong relief grid structures of different depths are produced in such a way that they are intercalated in one plane, as is described, for example, in West German Patent Applications Nos. P 26 57 246.3, P 27 34 581.9 and P 27 34 580.8 corresponding to copending U.S. Application Ser. Nos. 861,491, 928,700, and 928,701, filed Dec. 16, 1979, July 27, 1978 and July 27, 1978, respectively. These relief grid structures in one plane are advantageously complemented by irregular relief structures for representing black, as is explained in West German Patent Application No. P 25 51 741.5 which corresponds to copending U.S. Application Ser. No. 961,440 filed Nov. 16, 1978.

Figure 4:
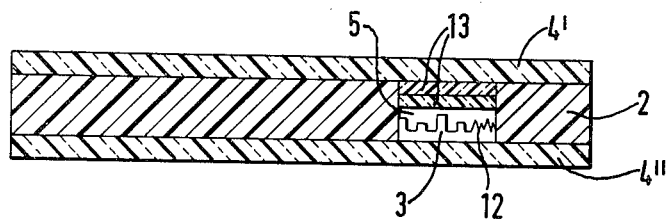
FIG. 4 is a side cross-sectional view of an identity card with grid images having a relief grid structure.

The identity card 1 shown in FIG. 4 has a grid image 3 with oblong relief grid structures of different depths in the opening of the window 5, which grid image is complemented by irregular relief grid structures 12. The space above the grid image 3 can be occupied by one or more transparent film inserts 13 which are not capable of lamination. In FIG. 4, two such film inserts 13 are drawn, but it is also possible that only one film insert 13 or more than two film inserts fill up the window zone above the grid image 3. As an experiment, a single-layer grid image was integrated in an identity card 1 built up in this way, which grid image is multi-colored in reconstruction and, when reproduced, shows the black West German Federal Eagle on a black/red/golden-yellow background. The reconstructed image could be viewed using a conventional slide projector or a microfilm reader, but it was also possible to discern the image even with visual observation in approximately vertically transmitted light. In reflected light, however, neither a black and white image nor a colored image was visible. It is therefore impossible, solely on the basis of the optical impression, to carry out a forgery of a relief grid image of this type in such a way that the latter is replaced by a color photograph.

A security mark, such as a colored relief grid image, should be incorporated, as much as possible, in the particular identity card in such a manner that it cannot readily be taken out of the card and inserted into another card. One step in this direction consists of inserting the grid image not in the form of a platelet into the opening of the window of the card core, but in producing it integrally in the identity card on a continuous card layer which functions as a grid image carrier. For this purpose, the card core can partially be coated with a photo-emulsion, in particular in the window zone. Similarly, it is possible to apply a photoconductor layer for the production of toner images or to apply a thermoplastic, photoconducting recording layer for the production of relief images. It is also possible directly to form a toner image, on a core film or on the inside of one of the cover films, by transfer or electrographically via a charge image produced by means of recorder electrodes. A further possibility consists in embossing a grid image into the window zone of a transparent continuous film.

Figure 5:
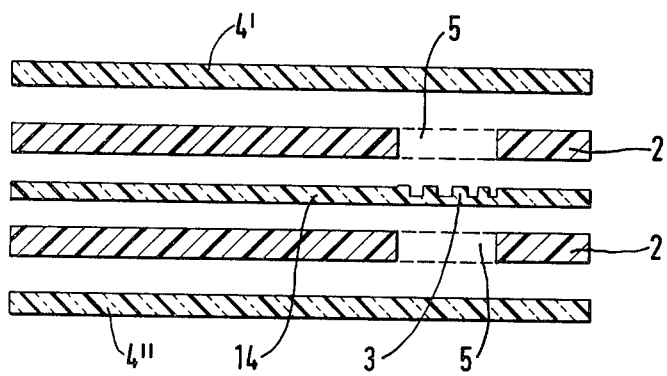
FIG. 5 is a side cross-sectional exploded view of another embodiment of the identity card.

FIG. 5 shows a further embodiment of an identity card 1 in which the card core consists of two matt films 2 which enclose a continuous grid image carrier 14 of transparent film. The grid image 3 was embossed onto the grid image carrier 14 beforehand. Experiments have shown that it is virtually impossible to cut the grid image 3 out of a continuous grid image carrier 14 of this type without damage and to insert this grid image into another card in such a way that no cut edges are visible.

Figure 6A:
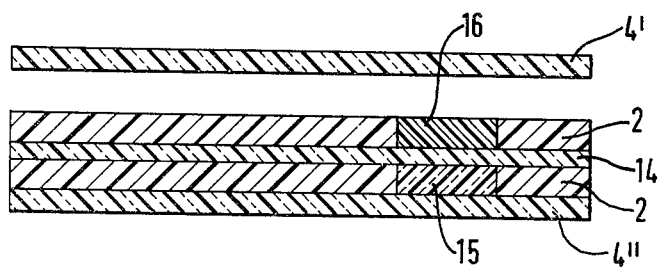
FIGS. 6a and 6b are side cross-sectional views of the manufacturing process for a further embodiment of an identity card in accordance with the present invention.
Figure 6B:
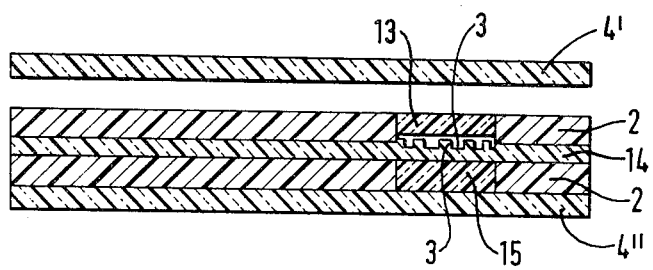

FIGS. 6a and 6b show an embodiment which has a card construction which is particularly stable in use. The manufacture of this identity card takes place in two stages. Initially, the two-ply card core 2 which already contains the personal data of the cardholder and encloses the continuous grid image carrier 14, that is to say a transparent interposed film, is laminated with the film 4". In the window zone, the lower core film 2 receives a transparent film insert 15 capable of lamination. The window zone in the upper core film 2 is initially left open, for example using a laminating press of corresponding shape or an inserted disc 16 which is not capable of lamination and is shown in FIG. 6a. The disc 16 can, for example, consist of a polyester film of appropriate thickness.

In the case of an identity card consisting of polyvinyl chloride films, lamination is effected at temperatures of 130° C. to 160° C. and under pressures of about 10 to 30 bars (approximately 10 to 30 kp/m²) with press times of 5 to 10 minutes. Subsequently, the disc 16 is removed and one or more grid images 3 are impressed into the exposed grid image carrier 14 by means of a forming punch heated to about 140° C. Finally, a transparent film insert 13, not capable of lamination, is inserted as a thickness compensation disc in place of the disc 16 and the upper film 4' (FIG. 6b) is laminated on, while the grid image 3 located in the interior is protected.

Although the invention has been described relative to a specific embodiment thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property or privilege is claimed are defined as follows:

1. An identity card comprising:
   at least one layer, said layer including a window therein;
   a grid carrier located in said window, said grid image carrier comprising means for defining at least one grid image, said grid image having a linear grid structure of different depths, said grid image comprising means for producing during readout by light transmission during reconstruction at least one colored information; and
   means for carrying information identifying a cardholder, said grid images comprising at least one linear grid structure as protection against forgery.

2. An identity card according to claim 1, wherein said grid images are absorption images.

3. An identity card according to claim 1, wherein said grid images are phase images.

4. An identity card according to claim 1, wherein said grid images are both absorption images and phase images.

5. An identity card according to claim 1, wherein said grid images include grid structures having a period length of less than 1/400 mm.

6. An identity card according to claim 1, wherein the grid images are comprised of phase images having a relief grid structure.

7. An identity card according to claim 1, wherein said card comprises a plurality of layers.

8. An identity card according to claim 7, wherein said grid image comprises a plurality of superposed part images.

9. An identity card according to claim 8, wherein each of said part images have grid structures which differ from one another in at least one of their dimensions and orientations.

10. An identity card according to claim 7, wherein one of said layers comprises a card core, said card core including means defining a window.

11. An identity card according to claim 10, wherein said grid image carrier has said grid images applied thereto.

12. An identity card according to claim 10, wherein the grid image carrier extends beyond said window.

13. An identity card according to one of claims 10 to 12, wherein said plurality of layers includes at least two transparent films laminated on each side of said card core, said card further includes means for reinforcing said window, said reinforcing means comprising at least one transparent film insert capable of lamination.

14. An identity card according to one of claims 10 to 12, wherein said plurality of layers includes at least two transparent films laminated on each side of said card core, said card further includes means for reinforcing said window, said reinforcing means comprising at least one transparent film insert not capable of lamination.

15. An identity card according to one of claims 10 to 12, wherein said window has a diameter and said grid images include grid structures having a period length which is not less than the diameter of said window.

16. An identity card according to one of claims 10 to 12, wherein said window has a diameter and said grid images include grid structures having a period length smaller than the diameter of said window.

* * * * *

UNITED STATES PATENT AND TRADEMARK OFFICE
CERTIFICATE OF CORRECTION

PATENT NO. : 4,304,809
DATED : December 8, 1981
INVENTOR(S) : Roland MORAW and Goetz von dem BUSSCHE It is certified that error appears in the above—identified patent and that said Letters Patent is hereby corrected as shown below:

IN THE BIBLIOGRAPHICAL DATA:

Kindly correct the filing date from "Oct. 7, 1979" to -- December 7, 1979 -- in line designated as [22].

UNDER "OTHER PUBLICATIONS":

Kindly delete "KiKnop" and insert therefor -- K. Knop --.

Column 1, line 55, kindly delete "P 28 38 759.3" and insert therefor -- P 28 38 795.3 --.

Signed and Sealed this

Third Day of August 1982

[SEAL]

Attest:

GERALD J. MOSSINGHOFF

Attesting Officer       Commissioner of Patents and Trademarks